United States Patent [19]

LaValley

[11] 4,370,231

[45] Jan. 25, 1983

[54] ROTARY DRUM FILTER

[75] Inventor: Richard W. LaValley, Vancouver, Wash.

[73] Assignee: LaValley Industrial Plastics, Inc., Vancouver, Wash.

[21] Appl. No.: 299,535

[22] Filed: Sep. 4, 1981

[51] Int. Cl.³ .......................................... B01D 33/06
[52] U.S. Cl. .................... 210/404; 210/406
[58] Field of Search ........ 162/363, 364, 366, 369–372; 210/402, 404, 406

[56] References Cited

U.S. PATENT DOCUMENTS

| | | | |
|---|---|---|---|
| 3,150,082 | 9/1964 | Rich | 210/404 X |
| 3,150,083 | 9/1964 | Luthi | 210/404 |
| 3,225,935 | 12/1965 | Porteous | 210/404 |
| 3,306,457 | 2/1967 | Putnam | 210/404 X |
| 3,306,460 | 2/1967 | Luthi | 210/404 |
| 3,327,862 | 6/1967 | Carlsmith | 210/404 X |
| 3,327,863 | 6/1967 | Turner, Jr. | 210/404 X |
| 3,363,774 | 1/1968 | Luthi | 210/404 |
| 3,386,584 | 6/1968 | Luthi | 210/404 |
| 3,504,802 | 4/1970 | Luthi | 210/404 |
| 3,587,863 | 6/1971 | Kristofl | 210/404 |
| 3,680,708 | 8/1972 | Luthi | 210/404 |
| 3,794,178 | 2/1974 | Luthi | 210/404 |
| 3,837,499 | 9/1974 | Luthi | 210/404 |
| 3,894,899 | 7/1975 | Konopatov et al. | 210/404 X |
| 4,154,687 | 5/1979 | LaValley | 210/404 X |
| 4,276,169 | 6/1981 | Browne et al. | 210/406 X |

FOREIGN PATENT DOCUMENTS 608181 1/1935 Fed. Rep. of Germany ...... 210/404

*Primary Examiner*—Robert H. Spitzer
*Attorney, Agent, or Firm*—Klarquist, Sparkman, Campbell, Leigh, Whinston and Dellett

[57] ABSTRACT

A deck structure is described for a filtering apparatus having a rotatably mounted, generally cylindrical drum with filtering and vacuum drainage capability. The deck structure includes the following components: (1) a plurality of circumferentially spaced, axially extending, imperforate channel members affixed to the outer peripheral surface of the drum, the channel members each including a first peripherally extending surface which is radially spaced from the peripheral surface of the drum, the first surfaces defining filtrate slots which are at least about as wide in a circumferential direction as the first surfaces; (2) a plurality of axially extending, evenly circumferentially spaced dams mounted adjacent the outer periphery of at least some of the channel members, the dams defining filtrate compartments therebetween which lead to the vacuum drainage apparatus; and (3) a perforate support for supporting a filter above the filtrate compartments.

21 Claims, 9 Drawing Figures

ROTARY DRUM FILTER

BACKGROUND OF THE INVENTION

1. Field of the Invention

The present invention relates generally to rotary drum filters and more particularly to a deck structure for such a filter.

2. Description of the Prior Art

Rotary drum filters are commonly used in the pulp and paper-making industry to separate wood pulp from its filtrate. Such filters include a rotary drum partially submerged in a tank of pulp slurry. The drum has axially extending filtrate channels or compartments spaced about its periphery with such compartments being covered by a filter screen. The drum filter may be of the center valve type or the pipe machine type. With a center valve type filter each filtrate compartment opens into a center circumferential channel which communicates with a source of subatmospheric pressure. An arcuate, stationary valve member is mounted within and extends partially about the channel. As the drum rotates about its axis with subatmospheric pressure applied, the screen rotates through the pulp slurry, collecting a wet mat of fibers from the slurry. As the screen emerges from the tank, filtrate is drawn through the screen and compartments into the center channel, and from there is discharged through suitable piping, thereby removing the liquid from the mat. As the drum continues to rotate, the stationary valve member periodically blocks off the filtrate compartment outlets from the source of subatmospheric pressure, thus enabling removal of the pulp mat from the surface screen. A center valve type rotary drum filter is described in more detail in U.S. Pat. No. 4,154,687.

In a pipe machine type filter, the filtrate channels or compartments communicate through bucket sections, drainage conduits, and an annular valve housing in communication with the source of the subatmospheric pressure. A stationary valve positioned within a valve seat portion of the valve housing controls the application of subatmospheric pressure to the respective valve chambers of the housing. As the drum rotates about its axis with subatmospheric pressure applied, the screen rotates through the pulp slurry and collects a wet mat of fibers from the slurry. As the screen emerges from the tank, filtrate is drawn through the screen and compartments into the bucket sections. From the bucket sections, the filtrate passes through drainage conduits and valve chambers, where it is discharged through suitable piping from the drum, and thus liquid is removed from the mat. As the drum continues its rotation, the stationary valve member periodically blocks off the filtrate compartments from the source of subatmospheric pressure, thereby enabling removal of the pulp mat from the surface screen. A conventional pipe machine type rotary drum filter is described in more detail in U.S. Pat. No. 3,363,774 and in a pending U.S. patent application Ser. No. 06/231,236, which is assigned to the assignee of the present application.

The described drum filters operate to accrete a mat of wood pulp on the surface of the drum as the pulp slurry is filtered through the screen. If desired, the pulp mat can be washed by directing showers at the mat prior to its removal from the drum.

One of the more important characteristics of drum filters is that they be able to rapidly remove water and other liquid from the passages adjacent the pulp mat. This is desirable because liquid being drawn through the mat has to pass through the covering screen into the filtrate compartments, where it is directed axially, under the mat, for distances up to as much as 20 feet before being directed radially inward toward the center of the drum. Slow movement of this filtrate results in inefficient use of the subatmospheric pressure and is partially responsible for causing incomplete drainage of liquid from the pulp mat. This slow movement of filtrate, combined with the effects of gravity, also often causes rewetting of the pulp mat as a result of drainage from the filtrate compartments, back into the mat. This occurs primarily between the twelve and three o'clock positions (with a clockwise-rotating drum) and is most pronounced when the subatmospheric pressure is released for mat removal.

There are several drawbacks with incomplete drainage from the pulp mat. First, removal of liquid between the washing stages is incomplete, thereby decreasing the efficiency of the washing operations. Second, incomplete drainage often renders subsequent operations on the mat more difficult. For example, a greater quantity of chemicals, such as bleaches, must be used in the next stages of treatment if a higher proportion of liquid remains in the mat as it leaves the drum. Third, incomplete drainage may result in the mat sticking to the drum at the mat discharge station, even though the vacuum has been released. This occurs because of the inability of sufficient air to pass through the relatively wet mat to relieve the vacuum beneath the mat. This sticking may very well result in tearing of the mat at the discharge station, since a heavy, liquid-loaded mat is often weaker than one which has been thoroughly drained.

Another drawback with many conventional designs is that after the drum surface passes the mat discharge station and prior to submergence in the slurry, liquid remaining in the filtrate compartments and the drainage conduits drains by gravity out through the filter screen, causing the compartments and conduits to be empty at resubmergence. This is undesirable because the air trapped in the conduits at resubmergence prevents the vacuum system from rapidly reapplying vacuum to the drum, thus interfering with accretion of the new mat on the drum. Trapped air in the filtrate compartments also interferes with the flow of filtrate through the drainage conduits during the formation of the mat.

In order to overcome the afore-described problems, attempts have been made to reduce the dimensions of the slots which open into the filtrate compartments. One such approach, exemplified in U.S. Pat. Nos. 3,680,708, 3,386,584, 3,363,774, and 3,306,457, and depicted in FIG. 1, has been to utilize a filtrate compartment cover 2, one of which extends circumferentially from each of a plurality of axially extending filtrate dams 4, in a direction opposed to the direction of rotation of the drum, thereby defining narrow filtrate slots 6. A second such approach, exemplified by U.S. Pat. No. 3,794,178, and depicted in FIG. 2, has been to use a plurality of filtrate compartment covers 8 which extend in each circumferential direction to define narrow filtrate slots 9. U.S. Pat. No. 3,894,899 also discloses a system with relatively small openings into the filtrate compartments.

As a result of the filtrate compartment cover designs described above, these prior art proposals are somewhat effective in reducing the outward flow of filtrate from the filtrate compartment, thereby reducing rewetting. However, because of the substantial restriction on the free flow of liquid from the mat into the filtrate compartments, brought about by the reduced dimensions of the openings into the filtrate compartments, these prior art designs also tend to reduce the amount of liquid which is initially drained from the mat. The substantially closed construction of this type of design also retards the flow of filtrate along the filtrate compartments because of the increased surface friction. This tends to promote rather than retard rewetting.

Hence, it is a primary object of the present invention to provide an improved deck construction for a rotary drum type filtering apparatus which effectively and reliably overcomes the aforementioned drawbacks and limitations of the prior art proposals. More specifically, the present invention has as its objects one or more of the following, taken individually or in combination:

(1) To develop a filtrate comartment design which opens up the deck, thereby facilitating better drainage from the mat;

(2) The provision of a deck construction which minimizes rewetting of the mat;

(3) To provide a filtrate compartment design in which the flow of filtrate from the mat and through the filtrate compartments is relatively fast, thereby enhancing drainage and reducing rewetting; and (4) The provision of a deck construction wherein the filtrate screen is adequately supported above such compartments against collapse, yet which provides minimal restriction to the flow of filtrate therethrough and does not necessitate the use of filter screen backing wire.

SUMMARY OF THE INVENTION

This invention responds to the problems presented in the prior art by providing a deck structure for a filtering apparatus including a rotatably mounted, generally cylindrical drum with filtering means and vacuum drainage means associated therewith. The deck structure includes the following components:

(1) a plurality of circumferentially spaced, axially extending, and radially projecting imperforate channel members affixed to the outer peripheral surface of the drum, the channel members each including a circumferentially extending surface which is radially spaced from the peripheral surface of the drum, the first surfaces defining filtrate slots which are at least as wide in a circumferential direction as the first surfaces;

(2) a plurality of axially extending, evenly circumferentially spaced dams mounted adjacent the outer periphery of at least some of said channel members, the dams defining filtrate compartments therebetween which lead to the vacuum drainage means within the drum; and (3) perforate support means for supporting the filtering means above the filtrate compartments.

Each of the channel members typically defines an axially extending retention channel within each subcompartment which is adapted to receive at least a portion of the filtrate in its filtrate compartment after the drum rotates past the twelve o'clock position, thereby minimizing rewetting of the fibrous mat which is formed on the filtering means.

The dams are normally disposed on the first surfaces such that at least a portion of the first surface extends from the dam in a direction of rotation of the drum. When the drum is adapted to be rotated in both directions, each of the dams is typically disposed such that the adjacent first surface extends in both circumferential directions from the dam.

The deck structure normally also includes radial flow means for directing at least a substantial portion of the filtrate to flow from the filtering means in a direct, radial direction into the filtrate compartments. This distinguishes the present invention from some of the prior art proposals, such as those depicted in FIGS. 1 and 2, wherein most of the filtrate must flow in one or more peripheral directions in order to enter the filtrate compartment; that is, only a small portion of the filtrate is permitted to flow in a direct, radial direction into the filtrate compartments. The structure of the present invention permits the dams to direct filtrate toward the filtrate compartments primarily radially rather than peripherally in a way which is superior to the prior art structures.

The invention may alternatively be defined as comprising a rotary drum type filtering apparatus adapted to be partially submerged in a tank filled with pulp slurry, with the apparatus including the following components: (1) a generally cylindrical, rotatably mounted drum; (2) a plurality of circumferentially spaced, axially extending, imperforate channel members mounted to the outer periphery of the drum to define a plurality of filtrate subcompartments, the channel members each including a first peripherally extending surface which is radially spaced from the drum, the first surfaces defining filtrate slots therebetween; (3) a plurality of axially extending dams mounted adjacent the outer periphery of at least some, but fewer than all, of the channel members to define a plurality of filtrate compartments of substantially equal size, the filtrate slots being at least about one-half of the width, in a circumferential direction, of each filtrate subcompartment; (4) perforate filtering means surrounding the drum disposed upwardly of the filtrate compartments for filtering the slurry as it enters the drum; (5) perforate support means disposed between the filtrate subcompartments and the filtering means, for supporting the filtering means above the filtrate compartments; and (6) suction drainage means for creating a suction within the drum to draw the filtrate through the filtering means and into the filtrate compartments and subcompartments, and to drain the filtrate therefrom.

Another way to define the invention is as a deck-supported drainage system for a rotary drum type filter which includes a generally cylindrical drum having a deck with drainage opening means therein, a filter screen supported in spaced relation to the deck for supporting a mat of pulp fibers, and suction means for drawing fluid from the mat and through the filter screen and drainage opening means. So defined, the deck-sypported drainage system includes: (1) a series of equally circumfentially spaced-apart imperforate continuous ribs projecting radially from the deck and extending axially out the drum to define therebetween a series of axially extending draining channels leading to the drainage opening means at one set of ends of the channels; (2) a cover plate supported at the radially outer end of each rib and extending circumferentially in a direction opposite the direction of rotation of the drum, each cover plate only partially covering a drainage channel to provide a drainage opening into each drainage channel between adjacent cover plates, each drainage opening having a circumferential width at least equal to one-half the width of a drainage channel; (3) a plurality of equally circumferentially spaced-apart imperforate dams projecting radially outward from some of the cover plates and extending axially of the drum to divide the deck circumferentially into a series of drainage compartments containing multiple drainage channels; and (4) a series of axially spaced-apart ridges for supporting the screen extending circumferentially of the drum between the dams and supported on the cover plates, the ridges defining grooves therebetween for guiding filtrate toward the drainage openings.

BRIEF DESCRIPTION OF THE DRAWINGS

The invention will be better understood, and objects other than those set forth above will become apparent when consideration is given to the following detailed description thereof. Such description makes reference to the annexed drawings wherein.

DETAILED DESCRIPTION OF THE PREFERRED EMBODIMENTS

General Description of a Rotary Drum Filter

Figure 2:
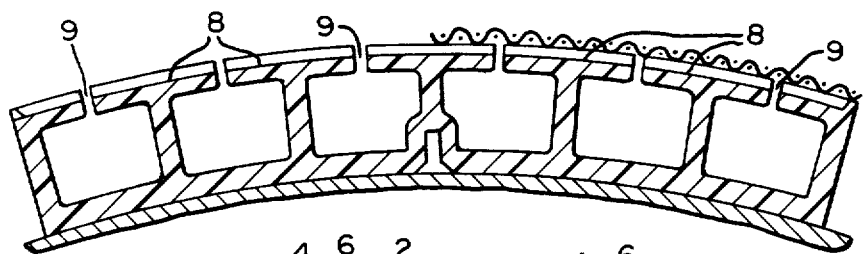
FIG. 2 depicts a prior art deck design, as described in U.S. Pat. No. 3,794,178.
Figure 1:
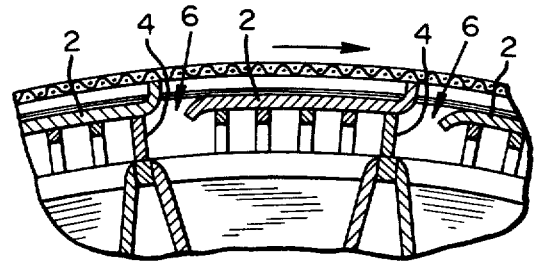
FIG. 1 depicts a prior art deck design, as described in U.S. Pat. No. 3,363,774.
Figure 3:
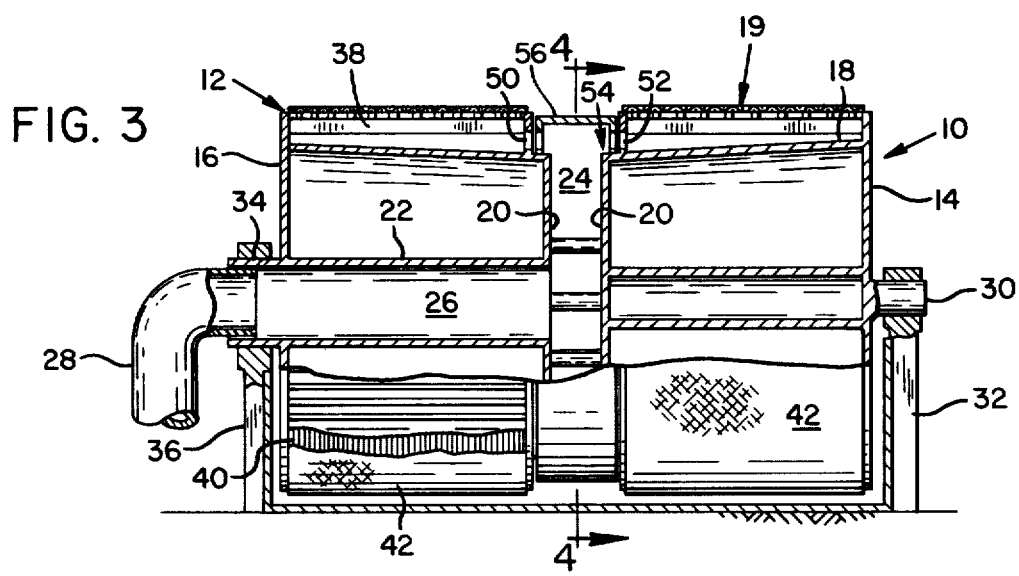
FIG. 3 is a front elevational view of a rotary drum filter of the center valve type having a deck design in accordance with the invention and with the surface portions of the drum broken away to show interior portions of the drum in section.
Figure 4:
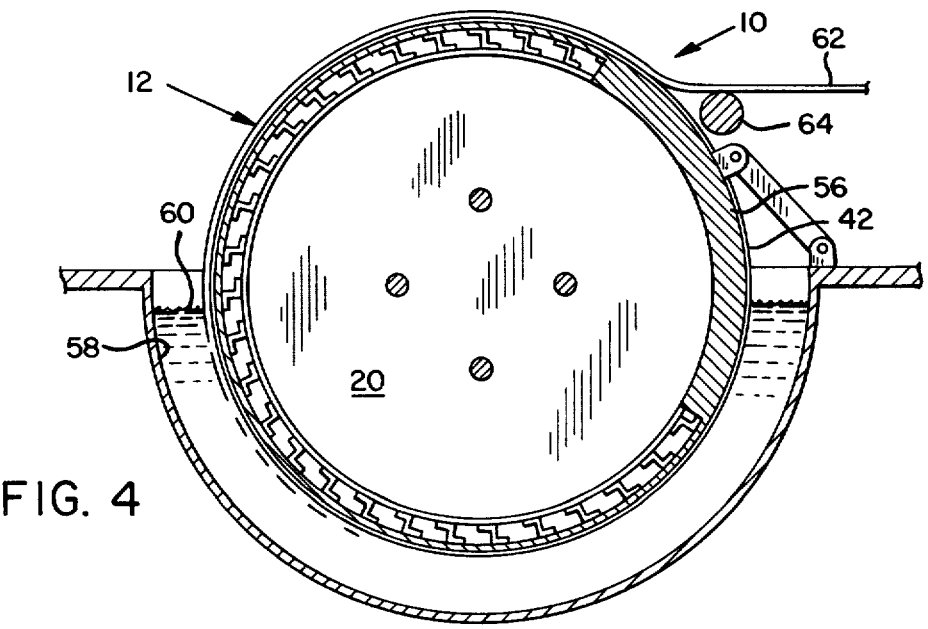
FIG. 4 is a somewhat schematic vertical sectional view taken along line 4—4 of FIG. 3.
Figure 5:
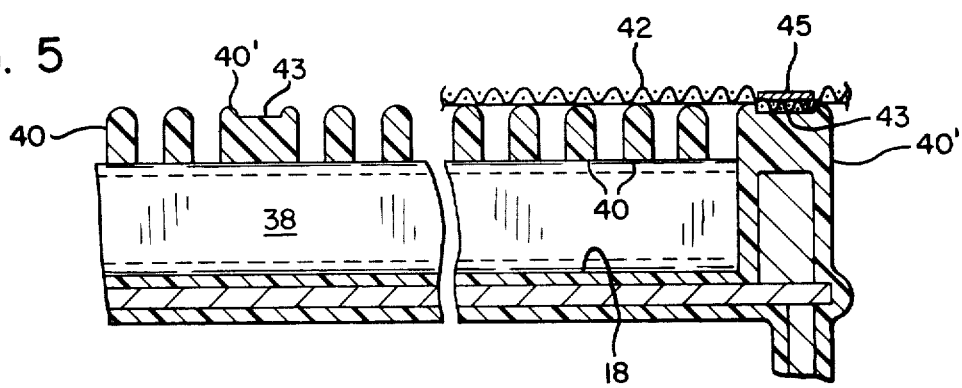
FIG. 5 is an enlarged, fragmentary sectional elevation view of the peripheral rib design incorporated in the embodiment of FIG. 3.

A rotary drum filter of the center valve type, in which the present invention can be incorporated, has been depicted in FIGS. 3 and 4 and is generally indicated with the numeral 10. However, as noted above, the present invention may also be utilized in rotary drum filters of the pipe machine type (not shown). The depicted rotary drum filter 10 includes a generally cylindrical drum 12 with flat opposite end walls 14 and 16 and a generally cylindrical deck plate 18. A deck structure, indicated generally with the numeral 19, is disposed outwardly of and is mounted to deck plate 18. Inner end or head walls 20, together with an axially extending, cylindrical inner wall 22, defines an interior drum passage including a radial passage 24 and an axial passage 26, the latter of which is connected to an external pipe 28. External pipe 28 is connected to a source of subatmospheric pressure (not shown). Drum 12 is rotatably mounted by a shaft 30 on a first support 32 at one end and by an external extension 34 of inner wall 22 on a second support 36 at the opposite end.

Embodiment of FIGS. 3-6

The deck structure 19 depicted in FIGS. 3-6 will now be described. Deck plate 18 supports a plurality of circumferentially spaced, axially extending, and radially projecting imperforate channel members or ribs 38. The term "channel members" is used in a broad sense to define any linearly extending support member; i.e., it is not necessarily intended to define a member which is "U" shaped in cross-section. In fact, in the embodiment of FIGS. 3-6 channel members 38 are substantially "Z" shaped in cross-section. As shown by the directional arrows in FIGS. 4 and 6, channel members 38 are disposed such that their upper legs or cover plates 37 extend in a circumferential direction opposed to the direction of rotation, while their lower legs or bases 39 extend generally in the direction of rotation. As shown best in FIG. 5, a plurality of parallel, axially spaced, circumferentially extending ribs or ridges 40 are disposed outwardly of channel members 38 and supported on cover plates 37 to define drainage grooves therebetween. Ribs 40 extend around the entire periphery of drum 12 and thereby serve collectively as perforate support means to support a filter screen 42 which also extends around the periphery of drum 12. Spaced ones of ribs 40, designated 40', include substantially planar lands 43 which are adapted to receive peripherally extending straps 45. Ribs 40 and 40' thus cooperate with straps 45 to securely hold filter screen 42 in place without causing it to collapse and without substantially interfering with the flow of filtrate. The ribs also define grooves therebetween which guide filtrate to the drainage openings.

Figure 6:
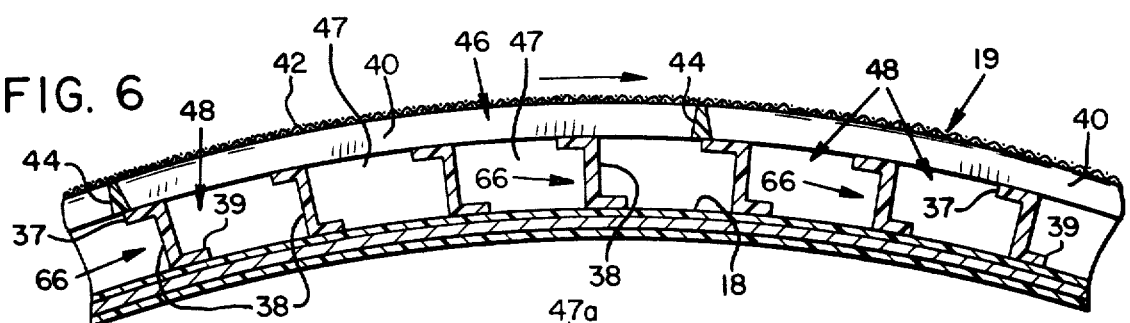
FIG. 6 is a fragmentary sectional view taken along line 6—6 of FIG. 3.

As seen best in FIG. 6, deck structure 19 also includes a plurality of axially extending, circumferentially spaced imperforate dams 44. In the embodiment depicted in FIG. 6, a dam 44 is mounted adjacent the downstream or trailing edge of the upper leg 37 of every fourth channel member 38.

This disposition is desirable for two reasons, both of which relate to the two separate functions performed by each of the dams 44. First, dams 44 extend through each of the ribs 40 and 40' and are typically constructed of a resilient material to accommodate for thermal expansion and contraction of the ribs. Since ribs 40 and 40' are fixed to the upper legs or cover plates 37, both ends of the ribs which abut dams 44 should not be disposed above cover plates 37 at this point. This is because the fixation of ribs 40 and 40' to cover plates 37 would tend to minimize or eliminate any peripheral expansion or contraction of the ribs at dams 44. To promote such expansion and contraction, dams 44 are disposed such that only one end of each of the ribs 40 and 40' is disposed immediately above cover plates 37.

The second reason for positioning dams 44 adjacent the downstream or trailing edge of upper legs or cover plates 37 relates to the dams' function of obstructing circumferential flow about the drum and directing filtrate downwardly into filtrate compartments 46 defined between the dams. If, for example, dams 44 were disposed adjacent the upstream or leading edge of upper legs 37, a small pocket of filtrate might form between the dam and its adjacent upper leg or cover plate 37, thereby bringing about the possibility of a certain amount of rewetting.

As noted above, in the embodiment depicted in FIG. 6, a dam 44 is mounted adjacent every fourth channel member 38. However, it should be appreciated that it may alternatively be possible to mount a dam adjacent every third or even every second channel member. In fact, the dams may even be more widely spaced than every fourth channel member. Normally, the dams are spaced at least two channel members apart, i.e., no closer than every second channel member, but this is not an essential feature. This spacing is determined in a pipe machine type filter by the number of drainage pipes. Pipe machine type filters typically include 24, 30 or 36 pipes. The number of filtrate compartments 46 defined between adjacent dams 44 should corespond to the number of drainage pipes so that one pipe is provided for each drainage compartment. With a center valve type filter, fifty center valve ports are typically provided, with a single filtrate compartment 46 being provided for each such port.

As noted above, dams 44 define axially and radially extending sets of filtrate compartments 46. Similarly, channel members 38 divide filtrate compartments 46 into separate subcompartments 48. As seen best in FIG. 6, the upper legs or cover plates 37 of channel members 38 cover no more than about one-half of the total circumferential width of the filtrate compartments 46 and subcompartments 48 to provide wide drainage openings 47 into the subcompartments. This is desirable in order to keep deck structure 19 open, thereby promoting the free, generally radial flow of filtrate into the subcompartments and limiting circumferential flow over the surfaces defined by cover plates 37. The lower legs or bases 39 of channel members 38 are merely of sufficient length to permit channel members 38 to be securely mounted to deck plate 18.

In the embodiment depicted in FIGS. 3-6, filtrate compartments 46 and subcompartments 48 are closed at their axially outer ends but open at their inner ends at openings 50 and 52 to a central, circumferentially extending channel 54. Channel 54 receives a stationary arcuate valve member 56 which extends through a predetermined arc of channel 54 as shown in FIG. 4.

OPERATION OF EMBODIMENT OF FIGS. 3-6

Drum 12 is partially submerged in a tank 58 which typically contains a pulp slurry 60. As the drum rotates in a clockwise direction, as indicated by the arrow in FIG. 4, valve member 56 periodically blocks off each filtrate compartment 46 from communication with the subatmospheric pressure within drum passages 24 and 26 and external pipe 28, thereby permitting the removal of a pulp mat 62 from drum 12 at a roller 64.

Mat 62 is formed as follows: as drum 12 rotates into pulp slurry 60, a partial vacuum is applied to filtrate compartments 46, causing pulp fibers in the slurry to collect on the surface of filter screen 42. As filter screen 42 emerges from slurry 60, the vacuum continues to be applied, drawing filtrate liquid from mat 62 into filtrate compartments 46. The floors of filtrate compartment 46 formed by deck plate 18 are sloped toward channel 54, causing the filtrate to flow readily from the open ends of the filtrate compartments into the channel and through radial passage 24 and axial passage 26. As each consecutive filtrate compartment becomes sealed off from the continuously applied vacuum by stationary valve member 56, the drained pulp mat 62 can be removed from the surface of filter screen 42.

A more detailed description of the operation of drum filter 10 will now be provided with emphasis upon the performance of the novel deck structure 19 provided by the present invention. As is clearly evident in FIG. 6, deck structure 19 is substantially open to the exterior of drum 12. It can be seen that the cover plates 37 of channel members 38 cover no more than about half of each of the filtrate subcompartments 48, thereby promoting free flow of filtrate through filter screen 42, generally radially through drainage openings 47 into subcompartments 48 of filtrate compartments 46, then axially along the subcompartments between channel members 38 to drainage openings 50 and 52, where the filtrate is conveyed through radial passage 24 to axial passage 26 and out of the drum through external pipe 8. The fact that there is no substantial change in direction in the flow of filtrate as it passes into filtrate compartments 46 and subcompartments 48 ensures that the flow of filtrate will be at a relatively high velocity. This promotes a high rate of flow of filtrate through filter screen 42, both before and after the compartments emerge from pulp slurry 60. This permits multiple spraying operations on mat 62 after it has emerged from slurry 60 and provides for virtually complete drainage of mat 62 before it is removed from filter screen 42 by roller 64. With the mat 62 washed and drained of excess fluids, it is relatively easy to remove from filter screen 42 and is a relatively strong mat, thereby reducing the likelihood of tearing during removal. This relatively complete drainage will also simplify subsequent operations to be performed on the mat.

As noted above, rewetting has heretofore been a problem because, as the filtrate compartments pass the twelve o'clock position and before the mat is removed from the drum, liquid tends to flow by gravity outwardly back into the mat. Prior art designs have attempted to restrict the flow of filtrate back into the mat through the use of various flow-restricting members. However, the same members which restrict flow outwardly to prevent rewetting, also necessarily restrict the free flow of filtrate inwardly through the filter screen and deck drainage system during the other parts of the cycle. The present invention provides an open deck structure which promotes the free, generally radial flow of filtrate into the drum, yet inhibits rewetting of the mat through the use of axially extending retention channel portions 66 which are defined by channel members 38, cover plates 37 and deck plate 18. Thus, by the time filtrate compartments 46 pass the twelve o'clock position, very little liquid will be retained in the pulp mat 62. This is a direct result of the open design of deck structure 19 which provides a minimum of surface area above deck plate 18. Once gravity begins to act on any remaining filtrate in filtrate copartments 46, this filtrate merely collects in retention channel portions 66. Thus, very little, if any, liquid can flow outwardly to rewet the mat 62.

EMBODIMENT OF FIG. 7

Figure 7:
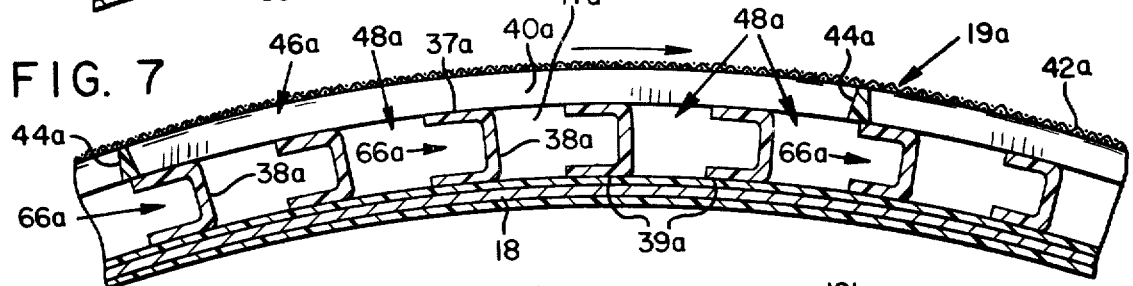
FIG. 7 depicts an alternate embodiment deck design taken along a section line which would be similar to that of line 6—6.

FIG. 7 depicts an alternate embodiment in which the channel members are shown to be substantially "C" shaped in cross-section (with the "C" appearing backwards as depicted in FIG. 7). Since the remaining structure of the embodiment of FIG. 7 is basically the same as that described above, the channel members and all other components of this embodiment have been suffixed with the letter "a". Thus, like the above-described embodiment, deck structure 19a includes channel members 38a with cover plates 37a which define drainage openings 47a into axially extending retention channel portions 66a and filtrate subcompartments 48a within filtrate compartments 46a. The cover plates 37a of channel members 38a cover only about one-half of the total circumferential extent of each filtrate compartment 46, while the lower legs or bases 39a are of sufficient length to provide a secure mounting to deck plate 18a. Like the embodiment previously described, dams 44a are disposed adjacent the following edge of the cover plates 37a of spaced channel members 38a to promote optimum drainage and help inhibit rewetting. Unlike the previously described embodiment, dams 44a are disposed adjacent every fifth channel member 38a; however, as noted above, this is not a critical distinction as long as the dams are evenly spaced about the periphery of drum 12. A filter screen 42a is also depicted in FIG. 7.

The operation of the embodiment of FIG. 7 is basically the same as that of FIGS. 3–6, with retention channel portions 66a retaining any remaining filtrate in filtrate compartments 46a, once such compartments have passed the twelve o'clock position.

EMBODIMENT OF FIG. 8

Figure 8:
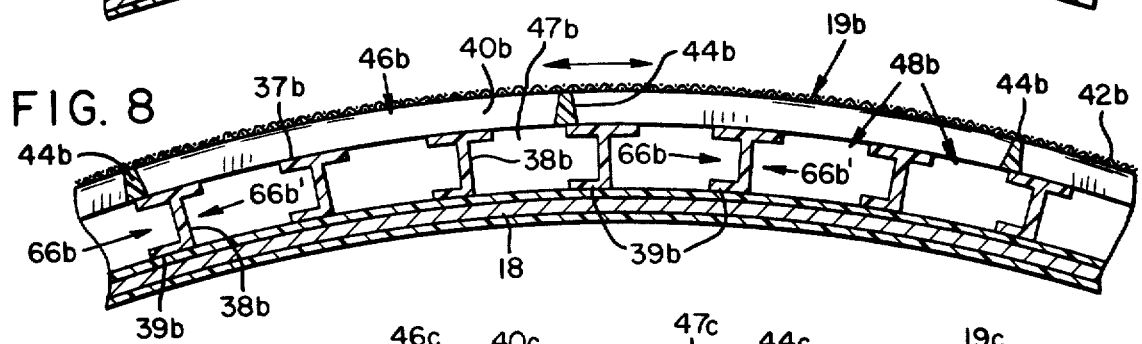
FIG. 8 depicts another alternate embodiment deck design taken along a section line which would be similar to that of line 6—6.

The embodiment of FIG. 8 is also similar to the embodiments described above; so the identification numerals of its components will be suffixed by the letter "b". Unlike the above-described embodiments, deck structure 19b is adapted to be used in conjunction with a drum which is rotatable in either direction, as illustrated by the directional arrow. This embodiment includes substantially "J" shaped channel members or ribs 38b; thus defining with cover plate 37b a pair of retention channel portions 66b and 66b' in adjacent subcompartments 48b. Deck structure 19b also includes dams 44b, a filter screen 42b, and in other respects is basically identical to the embodiment of FIGS. 3–6. Again, no more than about half of the circumferential extension of each of the filtrate compartments 46b is covered by the upper legs or cover plates 37b of channel members 38b to provide wide drainage openings 47b. This promotes free, generally radial flow of filtrate through the filtrate compartments, as described above. As mentioned above, deck structure 19b is rotatable in either direction. However, because of the disposition of dams 44b, deck structure 19b is more suitable for rotation in a clockwise direction since dams 44b will be disposed at the trailing edge of cover plates 37b during clockwise rotation. Thus, the positioning of dams 44b is somewhat of a compromise as compared to deck structrues 19 and 19a depicted in FIGS. 6 and 7. Like the earlier described embodiments, the lower leg or base 39b of channel members 38b is not critical and is merely provided to facilitate mounting to deck plate 18b. Therefore, the "J" shaped channel member 38b may actually be "T" shaped in certain applications, provided that suitable mounting means are provided.

The operation of deck structure 19b is substantially as described above, except that it is adapted to be operated in either direction. This capability is due to the presence of retention channels 66b and 66b' disposed on each side of channel member 38b. When rotation is clockwise, retention channels 66b function to inhibit rewetting; but when rotation is counterclockwise, retention channels 66b' function for that purpose. During clockwise rotation a small pocket of filtrate may tend to collect between dams 44b and cover plates 37b at approximately the ten o'clock position, but substantially all of the filtrate remaining in filtrate compartments 46b which is not drawn into the drum by the vacuum means, will be collected in retention channels 66b'.

EMBODIMENT OF FIG. 9

Figure 9:
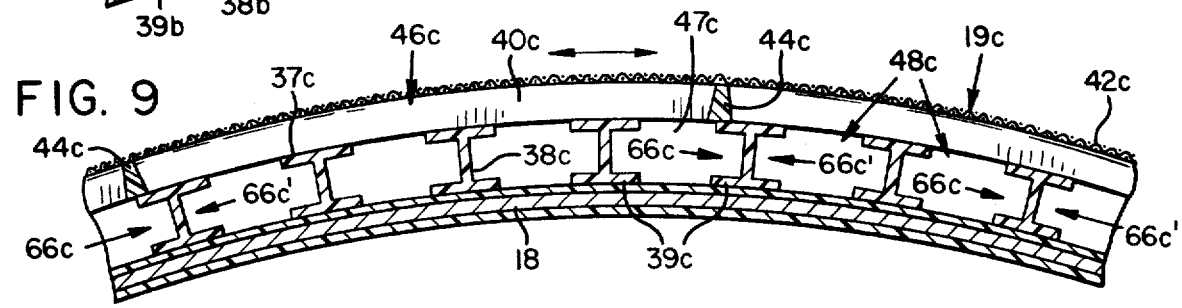
FIG. 9 depicts yet another alternate embodiment deck design taken along a section line which would be similar to that of line 6—6.

Deck structure 19c of FIG. 9, like the embodiment of FIG. 8, is adapted for use in either direction of rotation. The basic difference between this embodiment and that of FIG. 8 is that channel members or ribs 38c are "I" shaped in cross-section. Thus, this embodiment similarly provides a pair of retention channel portions 66c and 66c' in each subcompartment 48c and adjacent each channel member 38c but provides a symmetrical structure, rather than an asymmetrical structure such as that in FIG. 8. Like the above described embodiments, the upper legs or cover plates 37c of channel members 38c cover no more than about one-half of the total circumferential extent of filtrate compartments 46c, thereby providing relatively wide drainage openings 47c into the subcompartments 48c.

Like deck structure 19b, deck structure 19c is rotatable in either direction but, due to the disposition of dams 44c over the left edges of cover plates 37c, is more suitably operable in a clockwise direction. Thus, the operation of deck structure 19c is basically the same as that of the embodiment of FIG. 8.

Of course, it should be understood that various changes and modifications of the preferred embodiments described herein will be apparent to those skilled in the art. Such changes and modifications can be made without departing from the spirit and scope of the present invention and without diminishing its attendant advantages. It is, therefore, intended that such changes and modifications be covered by the following claims.

I claim:

1. A deck structure for a filtering apparatus including a rotatably mounted, generally cylindrical drum with filtering means and vacuum drainage means associated therewith, wherein said deck structure comprises:
   a plurality of circumferentially spaced, axially extending, and radially projecting imperforate channel members affixed to the outer peripheral surface of the drum, said channel members each including a first circumferentially extending surface which is radially spaced from the peripheral surface of the drum, said first surfaces defining filtrate slots which are at least about as wide in a circumferential direction as said first surfaces;
   a plurality of axially extending, evenly circumferentially spaced dams mounted adjacent the outer periphery of at least some of said channel members, said dams defining filtrate compartments and subcompartments therebetween which lead to the vacuum drainage means; and
   perforate support means for supporting the filtering means above said filtrate compartments.

2. The deck structure of claim 1 wherein each of said channel members defines an axially extending retention channel within each subcompartment, said retention channel being adapted to receive at least a portion of the filtrate in its filtrate compartment after the drum rotates past the twelve o'clock position, thereby minimizing rewetting of the fibrous mat formed on the filtering means.

3. The deck structure of claim 2 wherein each of said dams is disposed such that at least a portion of each of said first surface extends from said dam in a direction of rotation of the drum.

4. The deck structure of claim 3 wherein the drum is adapted to be rotated in both directions, and wherein at least a portion of said first peripherally extending surface of each of said channel members extends in both peripheral directions.

5. The deck structure of claim 2 further comprising radial flow means for directing at least a substantial portion of the filtrate to flow from the filtering means in a direct, radial direction into said subcompartments.

6. The deck structure of claim 2 wherein said channel members each includes a second peripherally extending surface which extends along the drum for mounting said channel members to the drum.

7. The deck structure of claim 2 wherein each of said channel members is substantially "Z" shaped in cross-section.

8. The deck structure of claim 2 wherein each of said channel members is substatially "J" shaped in cross-section.

9. The deck structure of claim 2 wherein each of said channel members is substantially "C" shaped in cross-section.

10. The deck structure of claim 2 wherein each of said channel members is substantially "I" shaped in cross-section.

11. The deck structure of claim 1 wherein said dams are mounted adjacent the outer periphery of no closer than every second said channel member so that at least two subcompartments are defined by adjacent channel members within each said filtrate compartment.

12. A rotary drum type filtering apparatus adapted to be partially submerged in a tank filled with pulp slurry, wherein the apparatus comprises:
   a generally cylindrical, rotatably mounted drum;
   a plurality of circumferentially spaced, axially extending, imperforate channel members mounted to the outer peripheral surface of said drum to define a plurality of filtrate subcompartments, said channel members each including a first circumferentially extending surface which is radially spaced from said peripheral surface of said drum, said first surfaces defining filtrate slots therebetween;
   a plurality of axially extending dams mounted adjacent the outer periphery of at least some, but fewer than all, of said channel members to define a plurality of filtrate compartments of substantially equal size;
   said filtrate slots being at least about one-half of the width, in a circumferential direction, of each said filtrate subcompartment;
   perforate filtering means surrounding said drum disposed outwardly of said filtrate compartments for filtering the slurry as it enters said drum;
   perforate support means disposed between said filtrate subcompartments and said filtering means, for supporting said filtering means above said filtrate compartments; and
   suction drainage means for creating a suction within said drum to draw the filtrate through said filtering means and into said filtrate compartments and subcompartments, and to drain the filtrate therefrom.

13. The apparatus of claim 12 wherein said dams are mounted to no less than every second said channel member so that at least two subcompartments are defined within each said filtrate compartment.

14. The apparatus of claim 12 or 13 wherein each of said channel members defines an axially extending chamber which is adapted to receive at least a portion of the filtrate in the adjacent filtrate compartment after said drum rotates past the twelve o'clock position, thereby minimizing rewetting of the fibrous mat formed on said filtering means.

15. The apparatus of claim 12 wherein said perforate support means comprise a plurality of parallel, peripherally extending ribs, at least some of which include lands thereon adapted to receive strapping for mounting said filtering means thereto.

16. In a rotary drum type filter including a generally cylindrical drum having a deck with drainage opening means therein, a filter screen supported in spaced relation to the deck for supporting a mat of pulp fibers, and suction means for drawing fluid from the mat and through the filter screen and drainage opening means, a deck-supported drainage system for the filter comprising:
   a series of equally circumferentially spaced-apart imperforate continuous ribs projecting radially from the deck and extending axially of the drum to define therebetween a series of axially extending drainage channels leading to the drainage opening means at one set of ends of said channels;
   a cover plate supported at the radially outer end of each rib and extending circumferentially in a direction opposite the direction of rotation of the drum, each said cover plate only partially covering a drainage channel to provide a drainage opening into each drainage channel between adjacent cover plates, each said drainage opening having a circumferential width at least equal to one-half the width of a drainage channel;
   a plurality of equally circumferentially spaced-apart imperforate dams projecting radially outwardly from at least some of said cover plates and extending axially of the drum to divide the deck circumferentially into a series of drainage compartments containing said drainage channels;
   and a series of axially spaced-apart ridges for supporting the screen extending circumferentially of the drum between said dams and supported on said cover plates, said ridges defining grooves therebetween for guiding filtrate toward the drainage openings.

17. A rotary drum type filter according to claim 16, wherein said cover plates extend only in a circumferential direction opposite the direction of rotation of the drum.

18. A rotary drum filter according to claim 17 wherein said dams are positioned at the free side edges of their associated said cover plates.

19. A rotary drum filter according to claim 17 wherein said dams are positioned at the rotatably trailing side edge of each of said cover plates.

20. A rotary drum filter according to claim 16 wherein said cover plates extend in both circumferential directions from their supporting ribs.

21. The drainage system of claim 16 wherein said dams project radially outwardly from no closer than every second of said cover plates.

* * * * *